Patented May 27, 1947

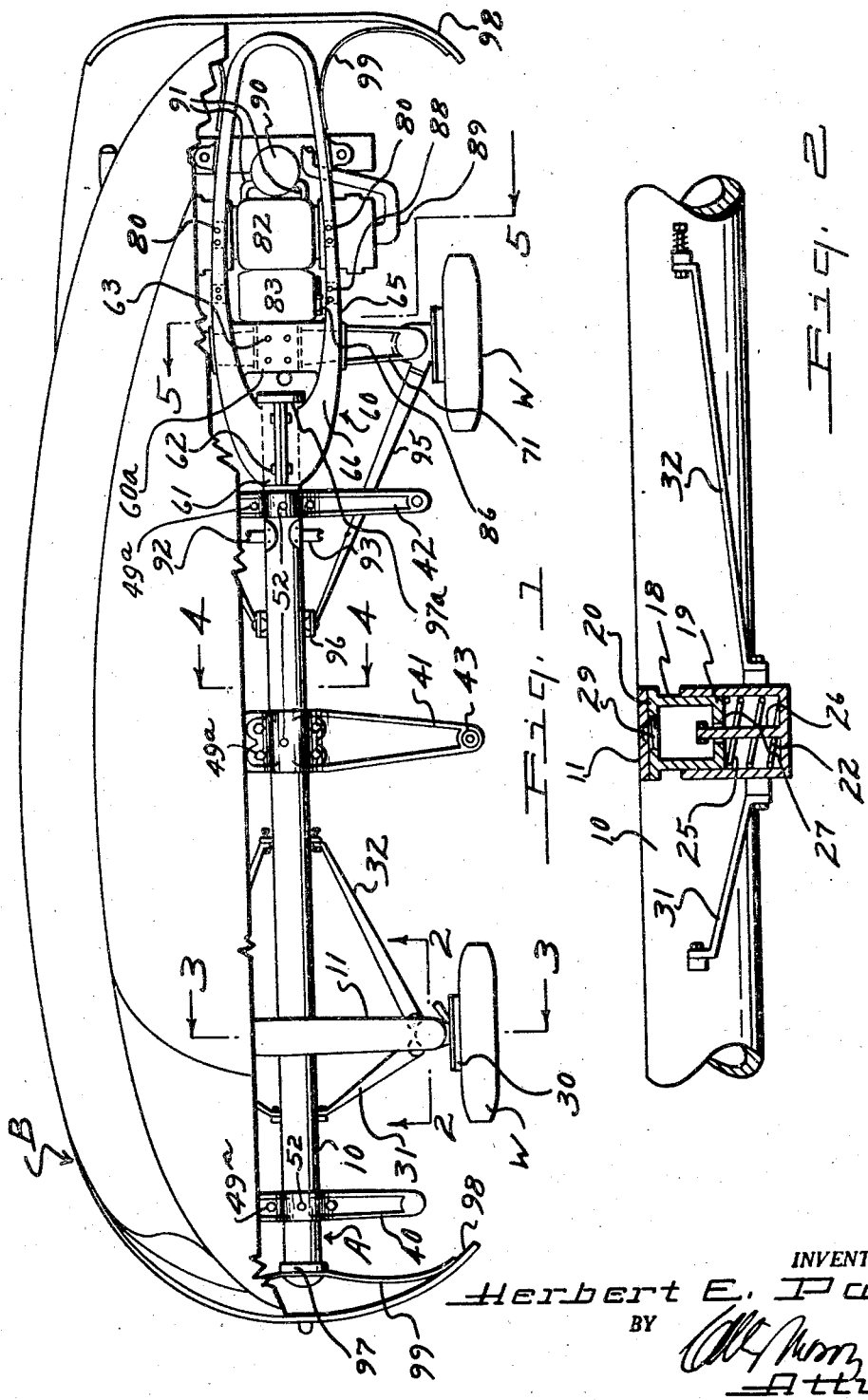

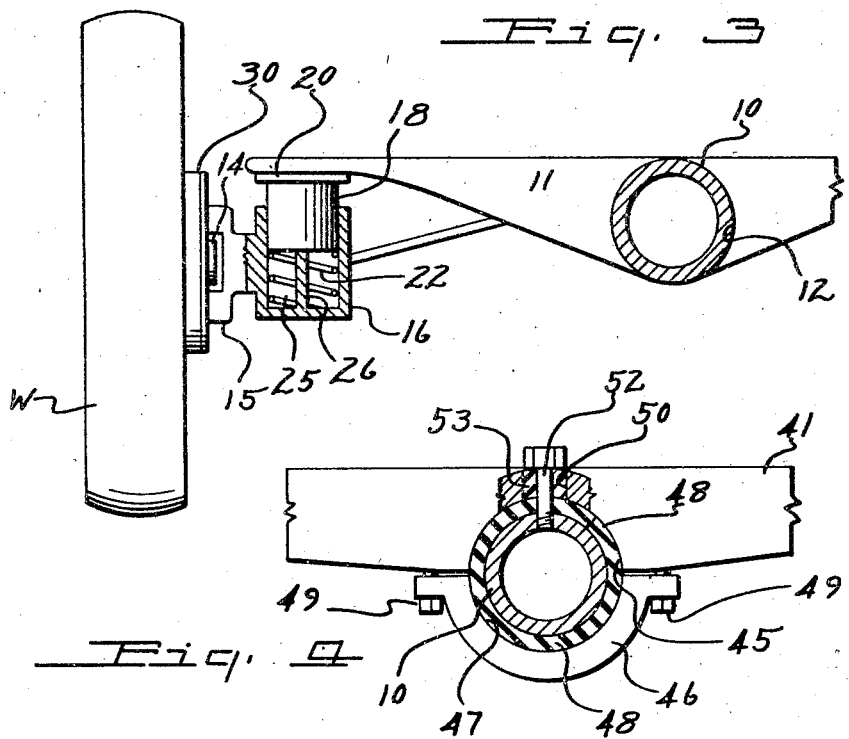
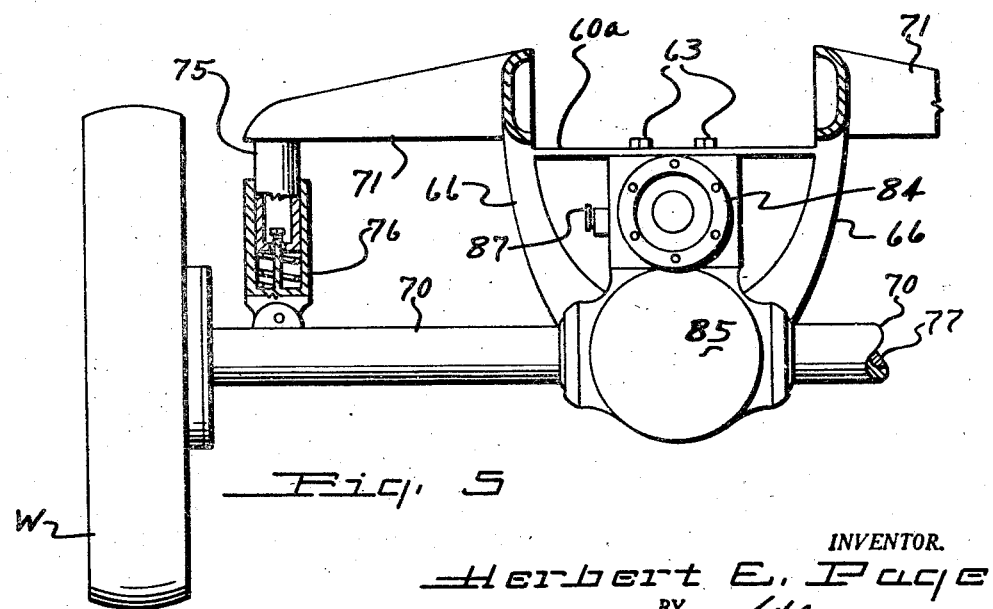

2,421,351

UNITED STATES PATENT OFFICE 2,421,351

VEHICLE CHASSIS CONSTRUCTION

Herbert E. Page, Alhambra, Calif.

Application September 25, 1944, Serial No. 555,635

1 Claim. (Cl. 280—124)

My present invention has to do with vehicle construction, relating more particularly to chassis construction, and has for one of its objects the provision of an improved type of chassis which prevents torsional stresses, resulting from road shocks, from being transmitted to the vehicle body.

Another object is the provision of a vehicle chassis utilizing what in effect is a tubular backbone instead of the conventional type of frame.

Another object is the provision in a vehicle chassis of an improved type of motor mount and wheel suspension, and in which the weight distribution is such as to eliminate the tendency of the vehicle to get out of control on curves and the like.

It is also an object to utilize the tubular chassis element as a container for the motor fuel.

My invention also has features of novelty and advantage which are conducive to the elimination of parts which has heretofore been deemed necessary, and which provide great durability and flexibility as well as economy of manufacture.

In order to explain my invention I shall now describe one of its embodiments, although I wish it to be understood that the details of construction now to be described are to be considered as illustrative only rather than limitative since the invention may be embodied in other forms within the limits of the appended claim.

For purposes of the following description I shall refer to the accompanying drawings, in which:

Fig. 1 is a top plan view with part of the body broken away for illustrative purposes;

Fig. 2 is an enlarged section taken on line 2—2 of Fig. 1;

Fig. 3 is an enlarged section taken on line 3—3 of Fig. 1;

Fig. 4 is an enlarged section taken on line 4—4 of Fig. 1; and

Fig. 5 is an enlarged section taken on line 5—5 of Fig. 1.

Vehicles such as automobiles have long conventionally utilized rectangular frames reinforced by diagonal cross members in the form of an X within the rectangle. Conventionally, the front and rear spring suspension and rear assemblies are attached to this frame and the body is secured thereon. An objectionable feature of this construction is that any diagonal stresses caused by the wheels passing over uneven surfaces are transmitted into the body, causing torsional strains which soon result in rattles and squeaks in the body. While attempts have been made to overcome this objection, those attempts have, in the main, consisted of redesigning and strengthening the bodies. By my improved construction, however, it is unnecessary to devote great attention to the design of the body inasmuch as the stresses caused by road shocks which usually rapidly deteriorate the vehicle are absorbed by my improved chassis construction.

Referring now to the drawings, A denotes the chassis and B the body mounted thereon. The chassis is comprised of a tubular member 10 disposed longitudinally and centrally of the vehicle, here shown as an automobile.

For the front wheel suspension I provide a cross bar 11 whose central portion is provided with a transverse opening 12 to fit over the tube 10, the bar preferably being welded to the tube to render it rigid therewith.

Each of the front wheels is mounted on a stem 14, hingedly secured to an axle 15 formed as a radially projecting integral part of a cylinder 16, which latter has reciprocally mounted therein a cylindrical piston 18 which has end walls 19 and 20. A coil spring 22 in cylinder 16 urges the piston 18 outwardly of the cylinder and the cylinder is normally filled with hydraulic fluid. A rod 26, which may be formed integral with or secured to the end wall of the cylinder, projects axially upwardly in the cylinder and passes through an opening 27 in the end wall 19 of the piston, the opening being larger than the rod 26, so as to provide a restricted fluid passageway between the interior of cylinder 16 and the interior of piston 18 to dampen and render smooth the action of the spring 22 as is the case in conventional shock absorber construction. A filling plug 29 is threadedly mounted in the end wall 20 of the piston.

Torque rods 31 and 32 are pivotally secured at one end to the cylinder 16 and pivotally secured at the other ends to brackets carried by the tube 10. A front wheel W carrying the usual brake assembly 30 is rotatably mounted on each stem 14. It will be understood, of course, that while I have only described the suspension of one of the front wheels, the other front wheel, not shown, is mounted in the same manner.

The body B is mounted on the three cross members 40, 41 and 42 which are secured to the tube 10 in like manner and I shall therefore describe only one of those members.

As may be best shown in Fig. 4, the member 41 has a semi-circular recess 45 and has secured to its bottom face a clamping plate 46 which presents a mating semi-circular recess 47. A soft rubber split sleeve 48 fits around the tube, and the member 41 and clamping plate 46 are clamped together about the rubber sleeve and tube by means of four bolts 49 which extend through the flanged ends of plate 46 and through holes in the channeled member 41 to receive nuts 49a (Fig 1). Cross members 40 and 42 are like member 41, except that they are smaller and are likewise mounted on the tube except that only two bolts carrying nuts 49 are employed.

To prevent rotation of the member 41 about the tube, I provide a hole 50 through the member 41 and registering holes in the sleeve and tube, through which holes extends a cap screw 52, a rubber sleeve 53 being mounted in the hole 50 around the screw. In some cases it may be desirable to provide a like flexible joint between the cross bars 11 and the tube. The body is suitably bolted to the outer ends of the cross members 40-42, a rubber pad 43 being interposed therebetween.

For the rear wheel suspension and motor mount I provide a frame 60 which is somewhat oval in plan and has an inner end providing a split collar 61 which is secured on the rear end of the tube 10, being clamped about the tube by bolts 62. The side arms 65 of the frame are curved upwardly at 66 and then extend horizontally rearwardly, so as to be spaced above the rear axle housings 70, converging at the rear. Opposed lateral arms 71 are formed integral with the frame 60 and at their outer ends have secured thereto the top end of a piston element 75 which reciprocates in a hydraulic cylinder 76 secured to the axle housing 70. The construction of piston 75 and cylinder 76 are as before described for the front wheel suspension and have the same interior construction.

The rear axle housings 70 are universally connected to the transmission casing 85 and the axles 77 within the housings are also universally connected to the transmission.

Suspended from the frame 60, as by bolts 80, there is an opposed cylinder type air-cooled motor 82 of conventional construction, to the end of the crank case of which a clutch housing 83 is secured, the clutch housing carrying conventional clutch mechanism, the clutch being operatively connected by a conventional drive, not shown, to a conventional transmission contained in the transmission housing 84 mounted atop the differential casing 85 carrying the differential assembly. A clutch actuated lever 86 is connected by suitable linkage, not shown, to a foot pedal in the driver's compartment and likewise the transmission shift lever 87 is connected by suitable linkage, not shown, with a shift element in the driver's compartment.

The clutch housing is secured to the sides 65 of the frame by bolts 88. From the exhaust manifold of the motor an exhaust conduit 89 leads to a conventional muffler, not shown, and an oil cooler 90 of conventional construction communicates with the motor through conduits 91. The frame 60 has a cross member 60a secured to the top of the transmission housing 84 by screws 63.

I utilize the hollow interior of the tube 10 to contain the gas fuel for operating the motor, a filling neck 92 leading from the tube to a point where its inlet end may be conventionally accessible, and an outlet tube 93 leading to the conventional carburetor of the motor, not shown.

Torque rods 95 are universally connected at one end to brackets 96 mounted on the tube 10 and are pivotally connected at their other ends to the respective cylinders 76.

A closure cap 97a is secured on the rear end of the tube 10 and a closure cap 97 is secured on the front end of the tube. Conventional bumpers 98 are secured respectively to the front end of the tube and to the frame 60 by flexible bars 99.

It will be observed from the foregoing description that the road shocks transmitted through the wheels W are absorbed by the hydraulic spring elements and the torque from those shocks is transmitted to the tube 10 so that the body is not subjected to the usual torque strains. The power plant, being mounted in the rear frame element 60, may be readily removed as a unit and the weight is concentrated in the rear of the vehicle where it is most beneficial under practical operating conditions. All possible unsprung weight has been eliminated inasmuch as all four wheels have individual suspensions.

I claim:

A vehicle having a body, a chassis comprising a tube disposed longitudinally under the body intermediate its sides, wheels rotatably and resiliently suspended from the tube, and means for mounting the body on the tube consisting of a resilient sleeve around the tube, a cross arm having a semi-circular sleeve-receiving recess in one of its side surfaces, a semi-circular sleeve-embracing clamp, means securing the clamp and cross arm together in clamping engagement about the sleeve, an opening through the cross arm, a resilient sleeve in the opening, an opening through the first-mentioned sleeve, and a screw extending through said openings and threaded into the tube.

HERBERT E. PAGE.

REFERENCES CITED

The following references are of record in the file of this patent:

UNITED STATES PATENTS

| Number | Name | Date |
| --- | --- | --- |
| 1,940,795 | Gerardi | Dec. 26, 1933 |
| 2,015,700 | Wagner | Oct. 1, 1935 |
| 2,177,893 | Krotz | Oct. 31, 1939 |
| 1,960,356 | Trager | May 29, 1934 |
| 2,094,882 | Garnett et al. | Oct. 5, 1937 |
| 1,991,619 | Mackenzie | Feb. 19, 1935 |
| 2,203,619 | Schroter et al. | June 4, 1940 |
| 2,155,521 | Zavarella | Apr. 25, 1939 |
| 2,068,049 | Ballew | Jan. 19, 1937 |
| 2,065,065 | Ford | Dec. 22, 1936 |

FOREIGN PATENTS

| Number | Country | Date |
| --- | --- | --- |
| 312,357 | Germany | May 24, 1919 |
| 637,755 | France | Feb. 7, 1928 |
| 577,665 | France | June 7, 1924 |